(12) United States Patent
Foxenland

(10) Patent No.: US 7,911,410 B2
(45) Date of Patent: Mar. 22, 2011

(54) PERIPHERAL WITH A DISPLAY

(75) Inventor: Eral Denis Foxenland, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 740 days.

(21) Appl. No.: 11/682,371

(22) Filed: Mar. 6, 2007

(65) Prior Publication Data
US 2008/0218435 A1    Sep. 11, 2008

(51) Int. Cl.
*G09G 5/00* (2006.01)
(52) U.S. Cl. .................. 345/8; 345/7; 345/169
(58) Field of Classification Search .......... 345/156–173, 345/7–9
See application file for complete search history.

(56) References Cited

U.S. PATENT DOCUMENTS

| | | | |
|---|---|---|---|
| 5,911,637 A * | 6/1999 | Yamagata | 473/333 |
| 5,991,637 A | 11/1999 | Mack, II et al. | |
| 7,555,318 B2 * | 6/2009 | Seshadri et al. | 455/569.1 |
| 2002/0081982 A1 | 6/2002 | Schwartz et al. | |
| 2006/0166716 A1 | 7/2006 | Seshadri et al. | |
| 2006/0203998 A1 | 9/2006 | Ben-Arie | |

FOREIGN PATENT DOCUMENTS

JP    2004-023712 A    1/2004

OTHER PUBLICATIONS

International Search Report with Written Opinion dated Feb. 5, 2008, 12 pages.

* cited by examiner

*Primary Examiner* — Duc Q Dinh
(74) *Attorney, Agent, or Firm* — Harrity & Harrity, LLP (57) ABSTRACT

A headset may include a communication interface to receive one or more images from a device. The headset may further include a pair of earpieces, each earpiece including a speaker and a display to show at least one of the one or more images from the device.

17 Claims, 11 Drawing Sheets

PERIPHERAL WITH A DISPLAY

TECHNICAL FIELD OF THE INVENTION

Implementations described herein are related to displays and in particular, pertain to methods and devices for displaying images on peripherals that are located in a user's personal space.

DESCRIPTION OF RELATED ART

Peripherals, such as headphones, earphones, headsets, and earpieces, allow a user to conveniently interact with communication and multimedia devices. For example, when a headset is attached to a cellular phone, the headset may provide a pair of speakers and a microphone for a user to exchange information with a caller without using the hands.

SUMMARY

According to one aspect, a headset may comprise a communication interface to receive one or more images from a device, and a pair of earpieces, each earpiece including a speaker and a display to show at least one of the one or more images from the device.

Additionally, the communicating interface may include a wireless communication interface.

Additionally, the headset may further comprise a processor to choose a display among the two displays included in the earpieces based on display information that is received at the communication interface and is associated with a first one of the one or more images, and to provide the first one of the one or more images to the chosen display.

Additionally, the one or more images may include a video.

Additionally, the headset may further comprise a memory to store images that are received from the device.

Additionally, the one or more images may include an image associated with a telephone number of an incoming call at the device.

Additionally, the one or more images may include an image associated with an application that is currently being executed at the device.

According to another aspect, a device may comprise a communication interface that establishes a communication link with a headset that includes a pair of earpieces, each earpiece including a display. Additionally, the device may further comprise a processor to retrieve an image, obtain display information associated with the image, identify one or more displays among the displays included in the earpieces based on the display information, and send the retrieved image to the identified one or more displays on the headset through the communication link.

Additionally, the device may further comprise a database that includes pieces of information, each piece of information relating an image to one or more displays.

Additionally, the device may include a mobile device, an audio player, or a video game console.

According to yet another aspect, an earpiece may comprise a communication interface to receive an image from a device, and a display to display the image, the display being integrated into a surface of the earpiece and being not viewable by a person wearing the earpiece.

Additionally, the communication interface may include a wireless communication interface.

Additionally, the image may include an image that is associated with a telephone number of an incoming call at the device.

Additionally, the image may include an image associated with a state of an application that is currently being executed at the device.

Additionally, the earpiece may further comprise at least one of a microphone, a speaker, or a display to display images to the person wearing the earpiece.

Additionally, a method may comprise retrieving images and pieces of display information from a database based on an identity of an active application, each piece of display information relating one or more destination displays to an image. Additionally, the method may further comprise establishing, in a personal space, wireless communication links from a device to one or more personal peripherals that are to receive the images, the one or more personal peripherals including the one or more destination displays. Additionally, the method may further comprise sending each of the images to the one or more destination displays through the wireless communication links.

Additionally, the method may further comprise causing personal peripherals to show one or more of the images at the one or more destination displays in accordance with a display theme and the identity of the active application.

Additionally, the method may further comprise creating an association between an application, images, and displays, and storing the association in the database.

According to yet another aspect, a system may include a headset and a device. Additionally, the headset may comprise a communication interface to receive one or more images, and a pair of earpieces, each earpiece including a speaker and a display to show at least one of the one or more images. Additionally, the device may comprise a communication interface that establishes a communication link with the headset. Additionally, the device may further comprise a processor to retrieve an image, obtain display information associated with the image, identify one or more displays among the displays included in the earpieces based on the display information, and send the retrieved image to the identified one or more displays on the headset through the communication link.

According to a further aspect, a headset may comprise means for receiving an image from a device through a wireless communication link within a personal space of an individual, and means for showing the received image on a display that is integrated into an earpiece of the headset, the image being outside a visual range of the individual when the individual is wearing the headset.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements.

The term "personal space," as used herein, may refer to the region surrounding a person (e.g., a bubble of 1-2 meter radius from the center of the person's body) that the person may consider the person's own domain or territory. A communication link may be in a personal space, if two devices that communicate through the communication link are in the same personal space.

The term "personal peripheral," as used herein, may describe a device that is separate from and used in conjunction with a main device that stays within the personal space of a user for periods of time (e.g., headset, watch, handbag, etc.).

The term "image," as used herein, may refer to a digital representation of visual information (e.g., a picture, a video, a photograph, animations, etc).

In the following implementations, a personal peripheral may include a display. By using a main device that is linked to the personal peripheral through a cable or a wireless communication channel, different images may be shown on the display of the personal peripheral. For example, a user may speak with a caller through a headset that is wirelessly linked to the user's cellular phone. When the user speaks, a display that is attached to the headset may show the image that indicates that the user is currently engaged in a conversation.

EXEMPLARY MAIN DEVICE AND PERIPHERAL

Figure 1:
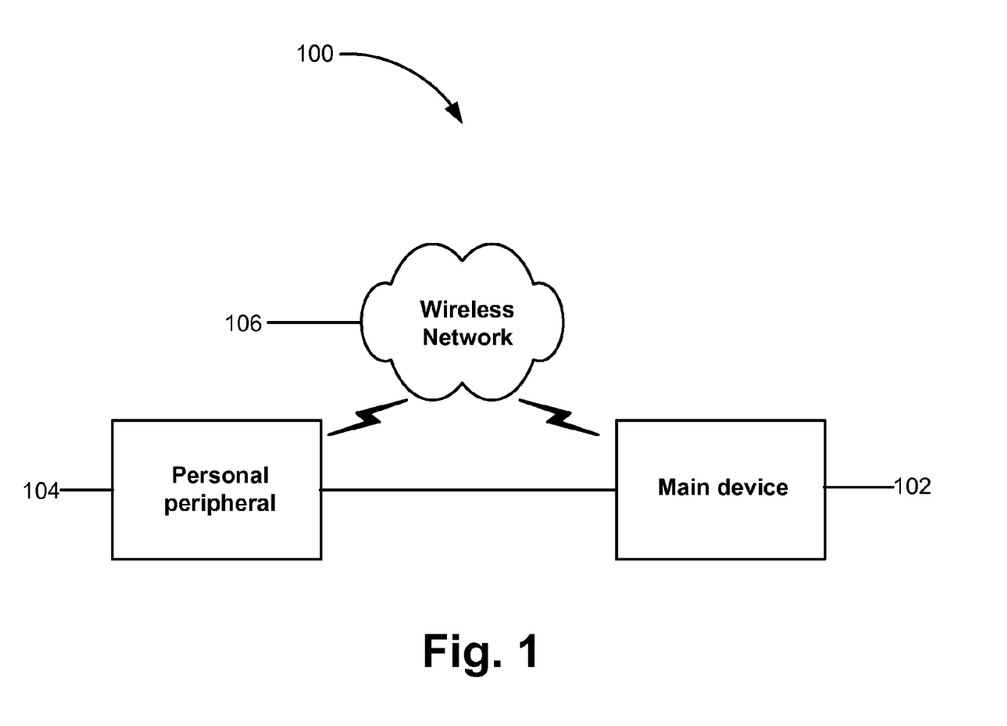
FIG. 1 depicts an exemplary network in which systems and methods described herein may be implemented.

FIG. 1 depicts an exemplary network in which systems and methods described herein may be implemented. As shown, network 100 may include a main device 102, a personal peripheral 104, and a wireless network 106. In practice, network 100 may include fewer or additional main devices, personal peripherals, and/or wireless networks.

Main device 102 may include any of the following devices that have the ability to communicate with personal peripherals: an audio player; a video player; a telephone, such as a radio telephone; a video game console; a personal communications system (PCS) terminal that may combine cellular radiotelephone with data processing, facsimile, and/or data communications capabilities; a mobile telephone; an electronic notepad; a laptop; a personal computer (PC); a personal digital assistant (PDA) that can include a radiotelephone, pager, Internet/intranet access, web browser, organizer, calendar, and/or GPS receiver; or any device with sufficient computing power and memory to support functions described herein.

Personal peripheral 104 may include devices that operate as peripherals for main device 102 within a user's personal space, and may communicate with main device 102 either wirelessly or through a cable. In the description to follow, personal peripheral 104 will be described in terms of a headset. A "headset," as the term is used herein, is to be broadly interpreted to include one or more of: a headphone; an earpiece; an earphone; a microphone; etc.

Wireless network 106 may include a local network that interconnects wireless devices (e.g., wireless personal peripherals) within their immediate proximity. These wireless devices may be located nearby and may frequently or occasionally come within range and go out of range of each other. In FIG. 1, personal peripheral 104 may communicate with main device 102 through wireless network 106.

Figure 2:
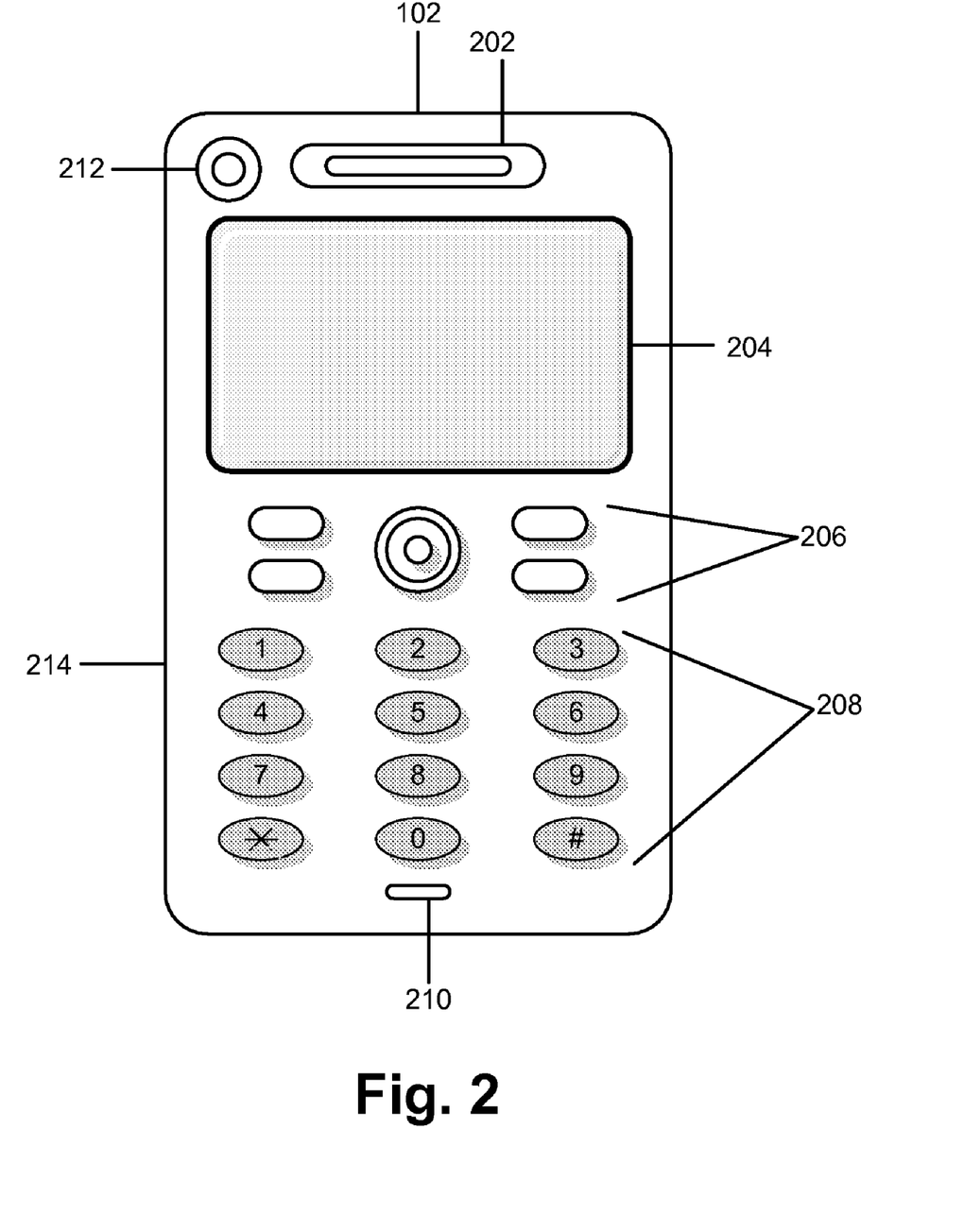
FIG. 2 is an exemplary diagram of the main device of FIG. 1.

FIG. 2 is an exemplary diagram of main device 102 of FIG. 1. As shown, main device 102 may include a speaker 202, a display 204, control buttons 206, a keypad 208, a microphone 210, a camera 212, and housing 214. Speaker 202 may provide audible information to a user of main device 102. Display 204 may provide visual information to the user. For example, display 204 may provide information regarding incoming or outgoing calls, media, games, phone books, the current time, etc. In one implementation, display 204 may provide the user with a graphical user interface for inputting various parameters associated with communication and image processing. Control buttons 206 may permit the user to interact with main device 102 to cause main device 102 to perform one or more operations. Keypad 208 may include a standard telephone keypad. Microphone 210 may receive audible information from the user. Camera 212 may enable a user to capture and store images (e.g., pictures, video clips). Housing 214 may provide a casing for components of main device 102 and may protect the components from outside elements.

Figure 3:
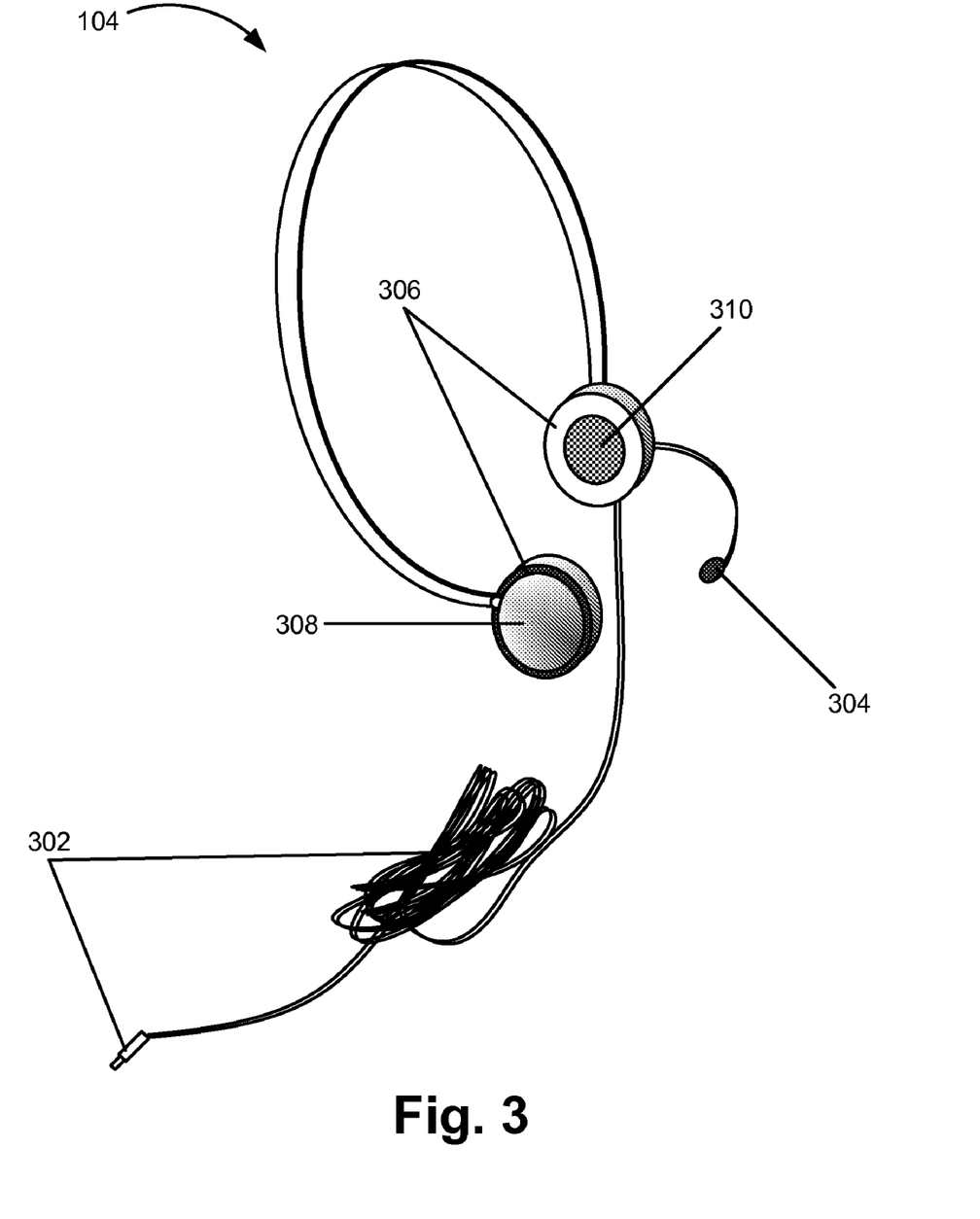
FIG. 3 is an exemplary diagram of the personal peripheral of FIG. 1.

FIG. 3 is an exemplary diagram of personal peripheral 104 of FIG. 1. As shown, personal peripheral 104 may include an interconnect 302, a microphone 304, and earpieces 306. Interconnect 302 may deliver signals from main device 102 to personal peripheral 104 and from personal peripheral 104 to main device 102. Microphone 304 may receive audible information from a user and deliver the information to personal peripheral 104.

As shown in FIG. 3, earpieces 306 may include a display 308 and a speaker 310. Display 308 may include a display that is integrated into earpieces 306 or that can be attached to or adapted to fit the surface of earpieces 306. Display 308 may be thin, bent, or bendable, and may provide a sufficient color and/or screen resolution for displaying images such as icons, logos, pictures (e.g., pictures of one's loved ones and pets, a real size picture of gems, jewelry, etc.), animations, etc. Speaker 310 may provide audible information to a user of personal peripheral 104.

Figure 4:
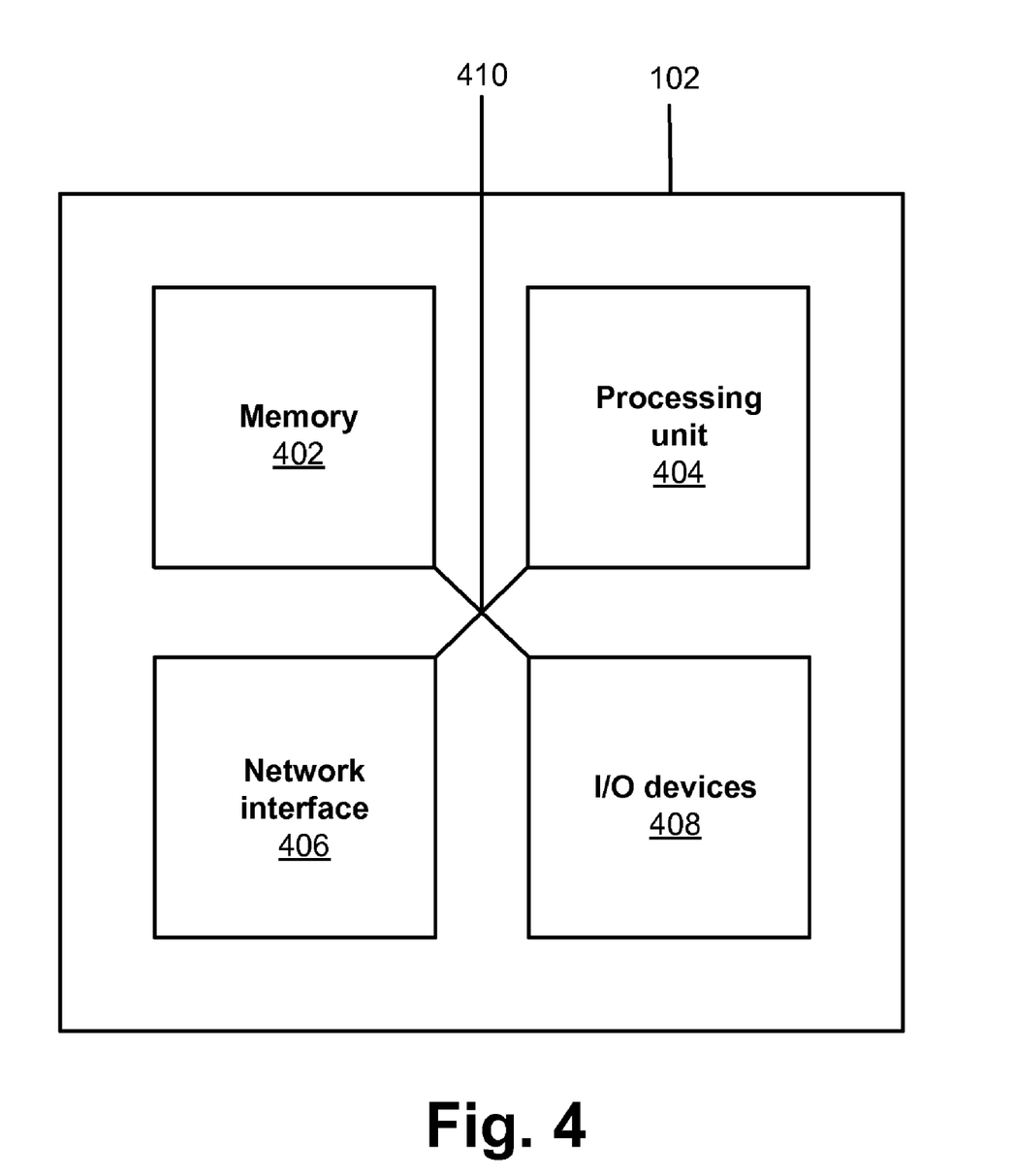
FIG. 4 is an exemplary block diagram of the main device of FIG. 1.

FIG. 4 is an exemplary block diagram of main device 102 of FIG. 1. As illustrated, main device 102 may include memory 402, a processing unit 404, a network interface 406, I/O devices 408, and bus 410. In other implementations, main device 102 may include fewer, additional, or different components than those illustrated in FIG. 4.

Memory 402 may include static memory, such as read only memory (ROM), and/or dynamic memory, such as random access memory (RAM), or onboard cache, for storing data and machine-readable instructions. Processing unit 404 may include one or more processors, microprocessors, and/or processing logic capable of controlling main device 102. Network interface 406 may include any transceiver-like mechanism that enables main device 102 to communicate with other devices and/or systems, such as personal peripheral 104. I/O devices 408 may include a display (e.g., display 204), keyboard, keypad (e.g., keypad 208), button, mouse, speaker, microphone (e.g., microphone 210), Digital Video Disk (DVD) writer, DVD reader, USB lines, and/or another type of device for converting physical events or phenomena to and/or from digital signals that pertain to main device 102. Bus 410 may provide an interface through which components of main device 102 can communicate with one another.

Figure 5:
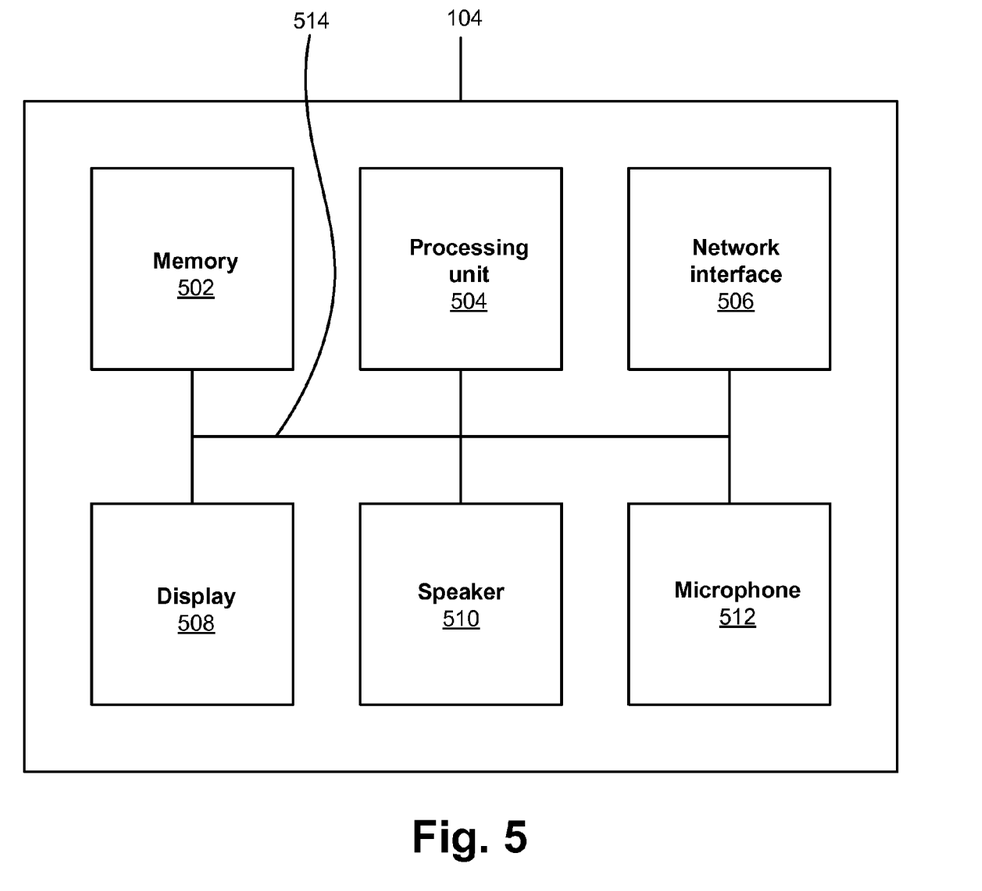
FIG. 5 is an exemplary block diagram of the personal peripheral of FIG. 1.

FIG. 5 is an exemplary block diagram of personal peripheral 104 of FIG. 1. As illustrated, personal peripheral 104 may include memory 502, a processing unit 504, a network interface 506, a display 508, a speaker 510, a microphone 512, and a bus 514. In other implementations, personal peripheral 104 may include fewer, additional, or different components than those illustrated in FIG. 5.

Memory 502 may include static memory, such as ROM, and/or dynamic memory, such as RAM, or onboard cache, for storing data and machine-readable instructions. Processing unit 504 may include one or more processors, microprocessors, and/or processing logic capable of controlling personal peripheral 104.

Network interface 506 may include any transceiver-like mechanism that enables personal peripheral 104 to communicate with other devices and/or systems. For example, network interface 506 may include mechanisms for communicating with main device 102 through a cable (e.g., interconnect). Additionally or alternatively, network interface 506 may include a wireless interface (e.g., a Bluetooth radio interface or an Ultra Wide Band (UWB) radio interface) for permitting wireless communication with main device 102.

Display 508 may include a device that can display signals that are generated or received by personal peripheral 104 as images on a screen. In one example, display 508 may provide information regarding incoming or outgoing calls on main device 102. Examples of display 408 include a liquid crystal display (LCD), organic light-emitting diode (OLED) display, bistable display, a touch screen, a bendable or flexible display (e.g., electronic paper), and any display that is capable of being integrated into, adapted to fit a surface of, or attached to personal peripheral 104.

Speaker 510 may provide audible information to the user of personal peripheral 104. An example of speaker 510 may include speaker 310 (FIG. 3). Microphone 512 may receive audible information from the user and relay the audible information to personal peripheral 104 to be processed for sending to main device 102. An example of microphone 512 may include microphone 304.

Bus 514 may provide an interface through which components of personal peripheral 104 can communicate with one another.

Figure 6:
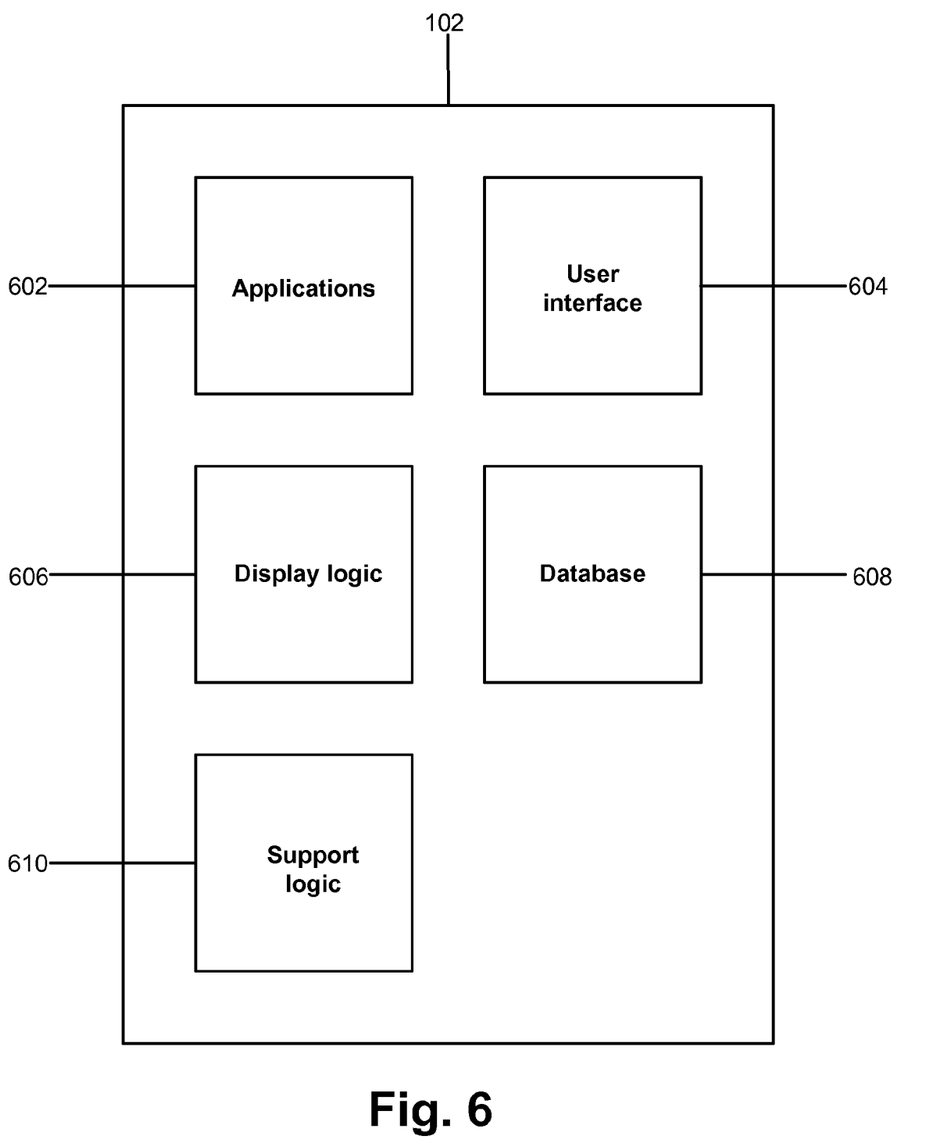
FIG. 6 is an exemplary functional block diagram of exemplary components that may be included in the main device of FIG. 4.

FIG. 6 is an exemplary functional block diagram of exemplary components that may be included in main device 102 of FIG. 1. As illustrated, main device 102 may include applications 602, user interface 604, display logic 606, database 608, and support logic 610. In practice, main device 102 may include additional, fewer, or different components than those illustrated in FIG. 6.

Applications 602 may include hardware and/or software for supporting various functionalities of main device 102, such as text messaging, email, Multimedia Messaging, wireless (e.g., Bluetooth) communications, infrared communications, web access, file uploading and downloading, image transfer, etc. User interface 604 may include hardware and/or software for allowing a user to interact with applications 602, display logic 606, database 608, and/or support logic 610.

Display logic 606 may include hardware and/or software for causing one or more images to be displayed on personal peripheral 104. In one implementation, display logic 606 may allow a user to select, through user interface 504, an image to be shown on display 308 on each of earpieces 302. The user may select the same image for both displays on earpieces 302, or a different image for each display 308. Display logic 606 may send the selected image or images to personal peripheral 104.

In another implementation, display logic 606 may monitor a user's activity at main device 102 and send one or more images relating to the activity to personal peripheral 104. If a user begins an activity, display logic 606 may send to personal peripheral 104 one or more images that have been selected by the user to represent the activity. Display logic 606 may accomplish the preceding by identifying an application that is active (e.g., a phone call handling application), fetching one or more images that are associated with the application from database 608, retrieving display information that specifies one or more displays for each of the images, and causing each image to be displayed on the corresponding displays. For example, when main device 102 receives a call, display logic 606 may identify the phone call handling application as the active application and may retrieve two images based on the identification. During the call, display logic 606 may cause one image to be shown on display 308 (FIG. 3) when a user is talking, and may cause the other image to be shown when the other party is talking.

If no application is in active (i.e., main device 102 is idle), display logic 606 may still retrieve one or more images and display information associated with the idle condition of main device 102, and cause the images to be displayed on personal peripheral 104. In one implementation, the display information may include logical addresses of the displays and may designate a destination display for each image. Because there may be more than one display on a personal peripheral and more than one personal peripheral that is in communication with main device 102, the logical addresses may be used to send an image to one or more of these displays.

In yet another implementation, display logic 606 may send images and/or display information for each image to be loaded, and allow a user to later select one or more of the loaded images to be displayed at personal peripheral 104. For example, display logic 606 may send images (e.g., a color, a pattern, etc.) that match a user's clothes to personal peripheral 104. Once the images have been loaded, by using display logic 606 of main device 102, the user may cause one or more of the images to be shown on display 308 (FIG. 3) of personal peripheral 104.

In yet another implementation, display logic 606 may provide the ability to set themes. For example, a user may employ display logic 606 to store a theme that includes one or more images (e.g., images with color patterns). When the user activates the theme, display logic 606 may cause one or more displays to show the images for the theme.

Returning to FIG. 6, database 608 may act as an information repository for applications 602, user interface 604, display logic 606, and/or support logic 610. For example, applications 602 may store and/or retrieve images and sounds to and from database 608. In addition, an association between one or more images, displays, and/or an application may be created and stored in database 608.

Database 608 may store images, information about callers (e.g., phone numbers, addresses, etc.), information about displays (e.g., an address of display 308), and/or information that specifies one or more images and displays for an application on main device 102 (i.e., an association between an image, a display, and an application).

For example, database 608 may include a video, a logical address of display 308, and an association that specifies the video and display 308 for an audio application (e.g., Motion Pictures Experts Group layer 3 (MP3) player application). If main device 102 runs the audio application, display logic 606 may identify the audio application, and retrieve the association from database 608 based on the identity of the application. Through the use of the association, display logic 606 may dispatch the correct images to the correct displays, to indicate that the user may be listening to music, sound, speech, etc.

In another example, database 608 may include a picture of a person, a pet or anything that may be associated with a particular caller. If a call is from the particular caller, display logic 606 may retrieve the picture from database 608 and show the picture at display 308 (FIG. 3), based on an identifier (e.g., phone number) associated with the incoming call. Such a picture may allow the user to grab and view one of earpieces 306 to determine who is calling and decide whether to take the call.

Additional examples of images that can be stored in database 608 may include: a logo, which may be sold with main device 102 as the default image for branding purposes; an image of a user's skin or of a user's ear that changes and morphs to produce a chameleon-like effect; videos of animations that pulse with music; images that make fashion statements; an image of an equalizer or a static music icon to be displayed when the user is listening to music or a radio station; etc.

Returning to FIG. 6, support logic 610 may include hardware and/or software for performing various support functions for applications 602, user interface 604, display logic 606, and database 608. For example, support logic 610 may provide a TCI/IP stack to support communication applications. Support logic 610 may also provide interfaces between the components illustrated in FIG. 6 (e.g., applications 602) and the components in FIG. 4 (e.g., network interface 406 and I/O devices 408).

Figure 7:
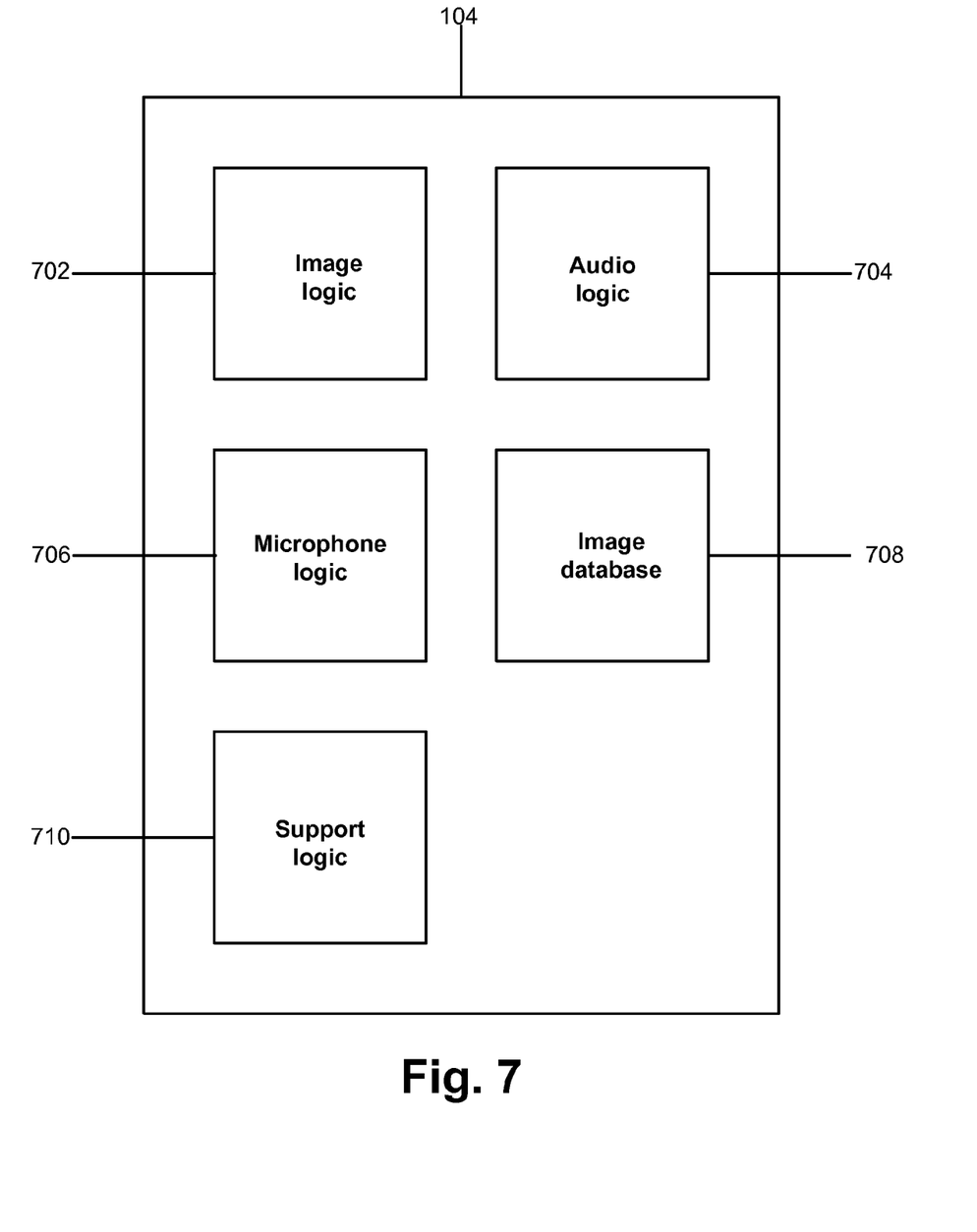
FIG. 7 is an exemplary functional block diagram of exemplary components that may be included in the personal peripheral of FIG. 5.

As described above, main device 102 may cause images to be displayed on personal peripheral 104. FIG. 7 illustrates an exemplary functional block diagram of exemplary components that may be included in personal peripheral 104 of FIG. 1.

As illustrated, personal peripheral 104 may include image logic 702, audio logic 704, microphone logic 706, image database 708, and/or support logic 710. In different implementations, personal peripheral 104 may include additional, fewer or different components than those illustrated in FIG. 7.

Image logic 702 may include hardware and/or software for generating image signals from data received from main device 102 and for causing images to be shown on display 308 (FIG. 3). Audio logic 704 may include hardware and/or software for generating audio signals from data received from main device 102 and for causing sounds to be generated by speaker 310. Microphone logic 706 may include hardware and/or software for processing signals from microphone 304 and causing sound signals to be sent to main device 102. Image database 708 may include images and/or display information that have been received from main device 102. When requested by main device 102, image logic 702 may select and retrieve one or more images from image database 610. The images may be displayed at display 308.

Support logic 710 may provide a support for receiving, processing and/or transmitting signals to and/or from main device 102. For example, support logic 710 may provide a Transmission Control Protocol (TCP)/Internet Protocol (IP) stack, buffers for received data, etc. In addition, support logic 710 may provide a support for interfacing image logic 702, audio logic 704, and/or microphone logic 706 to hardware components, such as microphone 304, display 308, and/or speaker 310.

EXEMPLARY PROCESS FOR DISPLAYING IMAGES AT A PERSONAL PERIPHERAL

Figure 8:
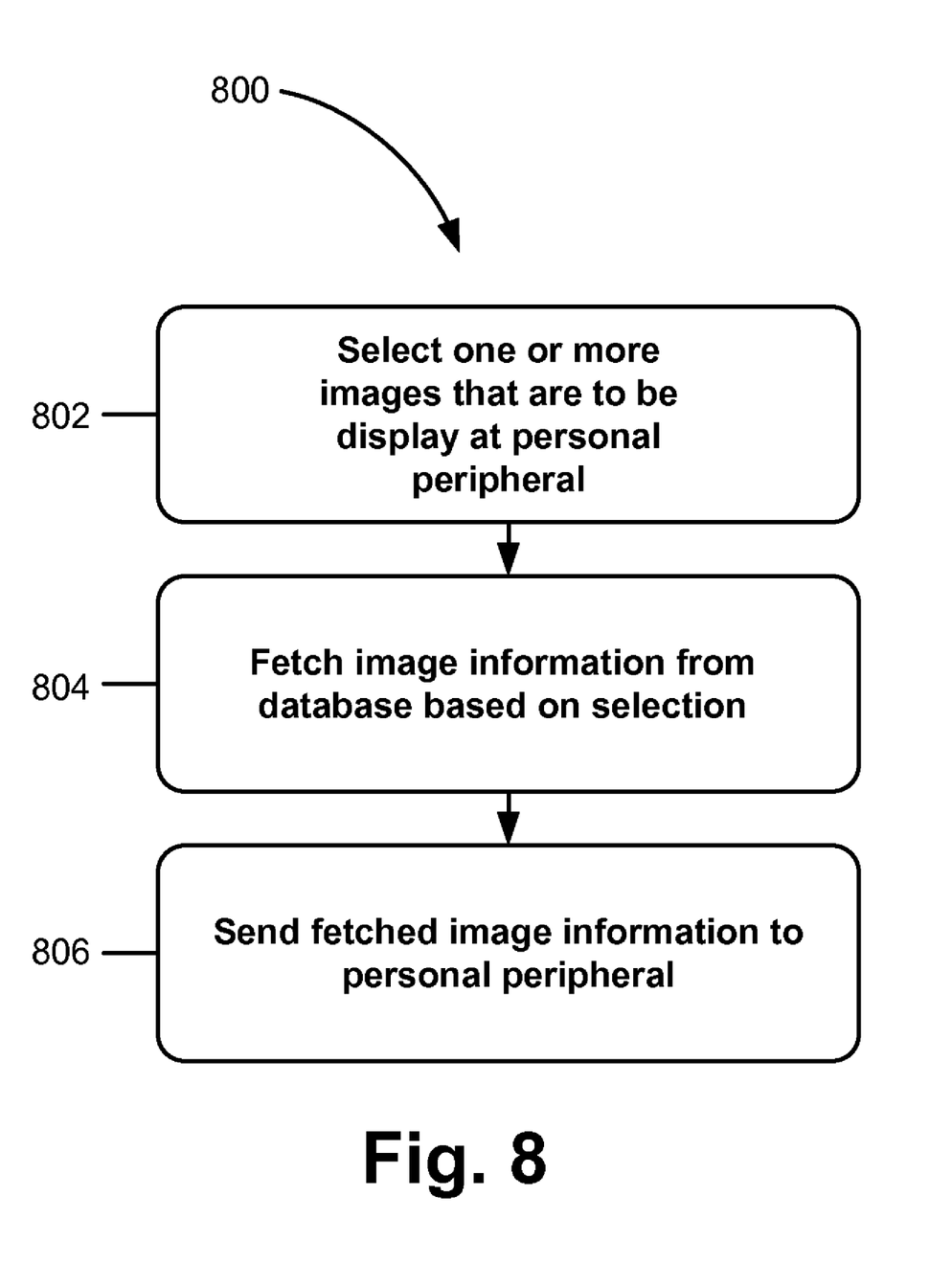
FIG. 8 shows an exemplary process for sending one or more images to the personal peripheral of FIG. 1.

FIG. 8 is an exemplary process 800 for sending one or more images to personal peripheral 104 of FIG. 1.

At block 802, one or more images that are to be displayed at personal peripheral 104 may be selected. Depending on implementation, the selection may be made by a user and/or by display logic 606. In one implementation, a user may select one or more images by using display logic 606. In another implementation, display logic 606 may automatically make the selection by monitoring a user's activity and selecting one or more images that are associated with the activity. If main device 102 is in an idle state (i.e., a user is not actively using main device 102), default images may be selected. In yet another implementation, a user may make the selection by activating a theme through display logic 606. When the user activates the theme, the selection may be made by display logic 606.

At block 804, image information may be fetched from database 608 based on the selection. In one implementation, the image information may include images and display information. In another implementation, the image information may specify which images among those stored at personal peripheral 104 are to be displayed.

At block 806, the fetched image information may be sent to personal peripheral 104. If a communication channel (e.g., wireless channel) is not established with personal peripheral 104, the communication channel may be established before sending the image information.

Figure 9:
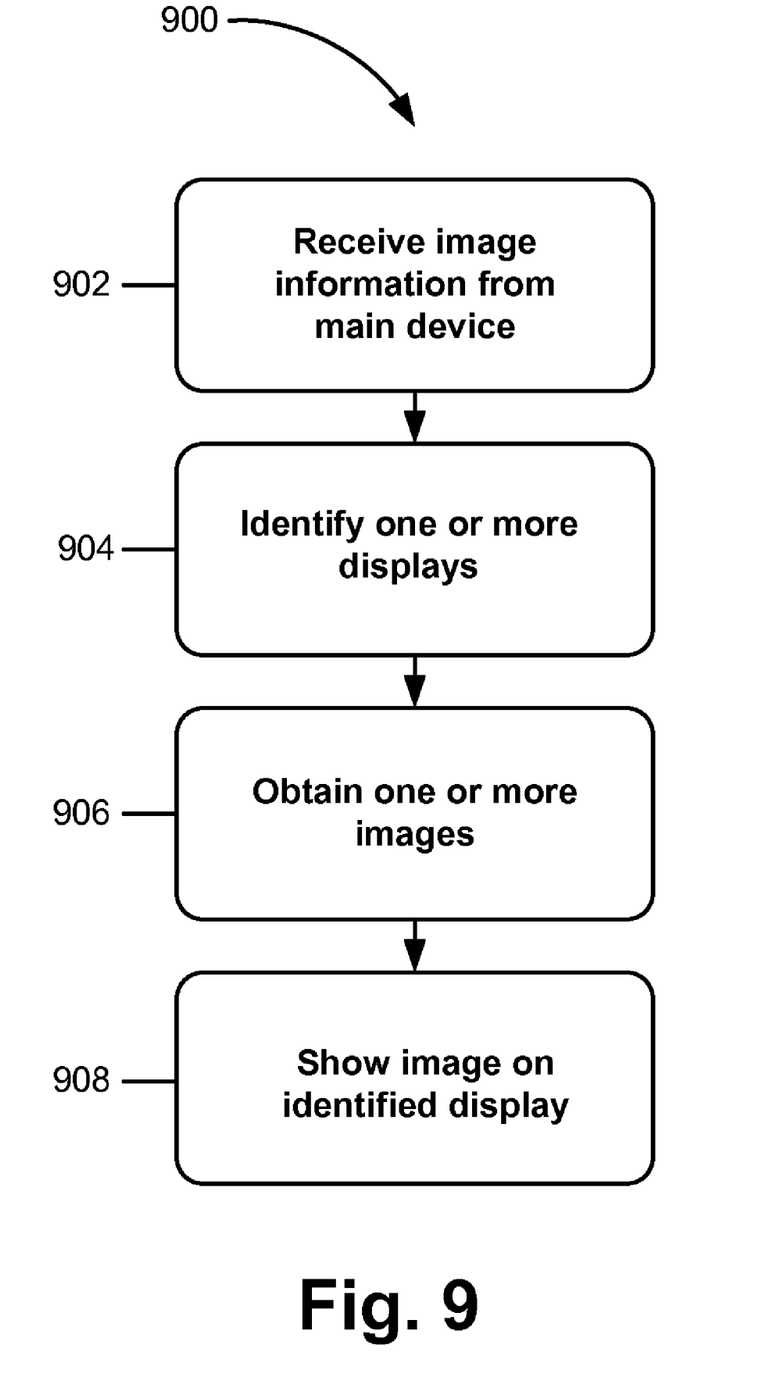
FIG. 9 is an exemplary process for displaying one or more images at the personal peripheral of FIG. 1.

FIG. 9 is an exemplary process for displaying one or more images at personal peripheral 104 of FIG. 1. At block 902, the image information may be received from main device 102.

At block 904, one or more displays may be identified. In one implementation, the identification may be made based on display information that is included in the image information. In another implementation, the display identification may be made based on display information that is retrieved from image database 708. In yet another implementation, image information for each display may arrive on a separate communication channel or a sub-channel. In such an implementation, it may not be necessary to identify the display based on the display information.

At block 906, one or more images may be obtained. In one implementation, the images may be obtained from the received image information, if the received image information includes the images themselves. In another implementation, the images may be obtained from image database 708 by performing a database lookup using the received image information. At block 908, the obtained images may be shown at the identified displays.

ALTERNATIVE IMPLEMENTATIONS

Figure 10:
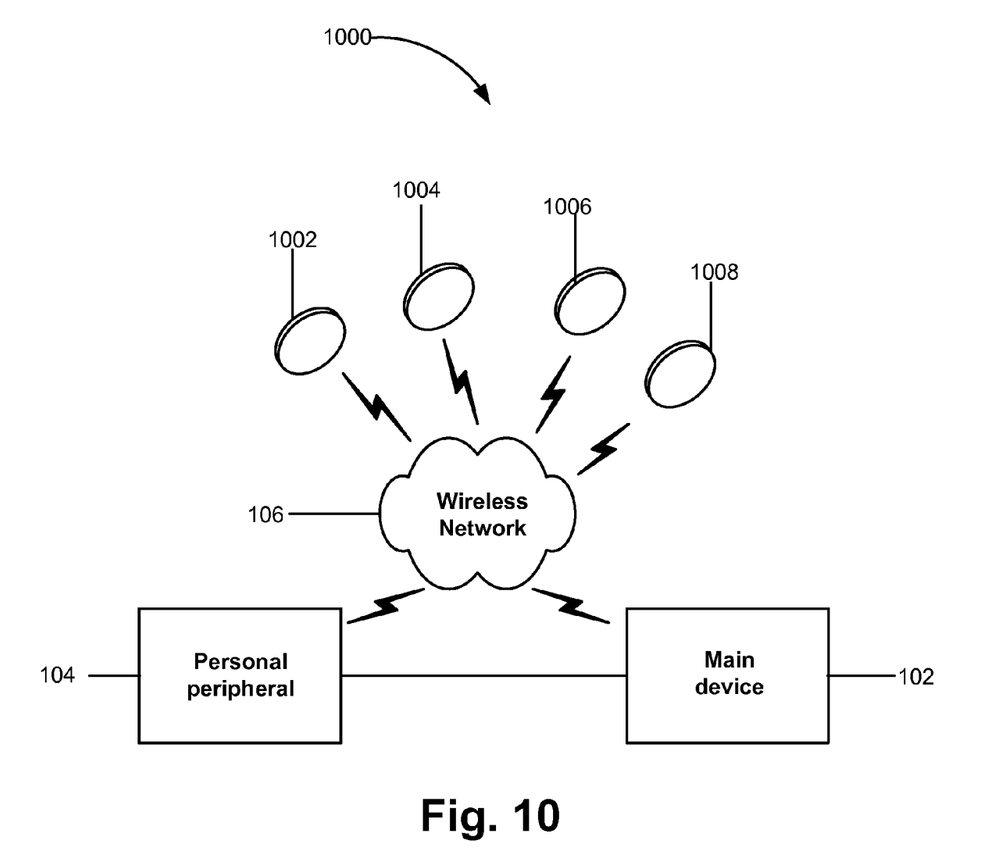
FIG. 10 illustrates a local network in which different implementations of personal peripherals communicate with the main device of FIG. 1.

Many changes to main device 102 and personal peripheral 104, along with associated processes, may be implemented. FIG. 10 illustrates a local network in which different implementations of personal peripherals communicate with main device 102 of FIG. 1. As shown, network 1000 may include personal peripherals 1002-1008 and 104, main device 102, and wireless network 106. Personal peripherals 1002-1008 may receive and display images in accordance with image information that is sent from main device 102. Main device 102, personal peripheral 104, and wireless network 106 have been described with respect to FIG. 1, and may operate in the manner already described.

In FIG. 10, each of personal peripherals 1002-1008 may take the form of a button (e.g., a button on a coat, or a jacket). In other implementations, personal peripherals 1002-1008 may take other forms, such as a headband, a wristband, earmuffs, a purse, a belt, and/or a personal object (i.e., an object in a personal space) with a body and a surface on which it is possible to integrate, attach, or fit a display and circuitry to interact with main device 102. By the use of main device 102, different images may be shown on the displays (not shown) of personal peripherals 1002-1008 in ways described above.

EXAMPLE

Figure 11A:
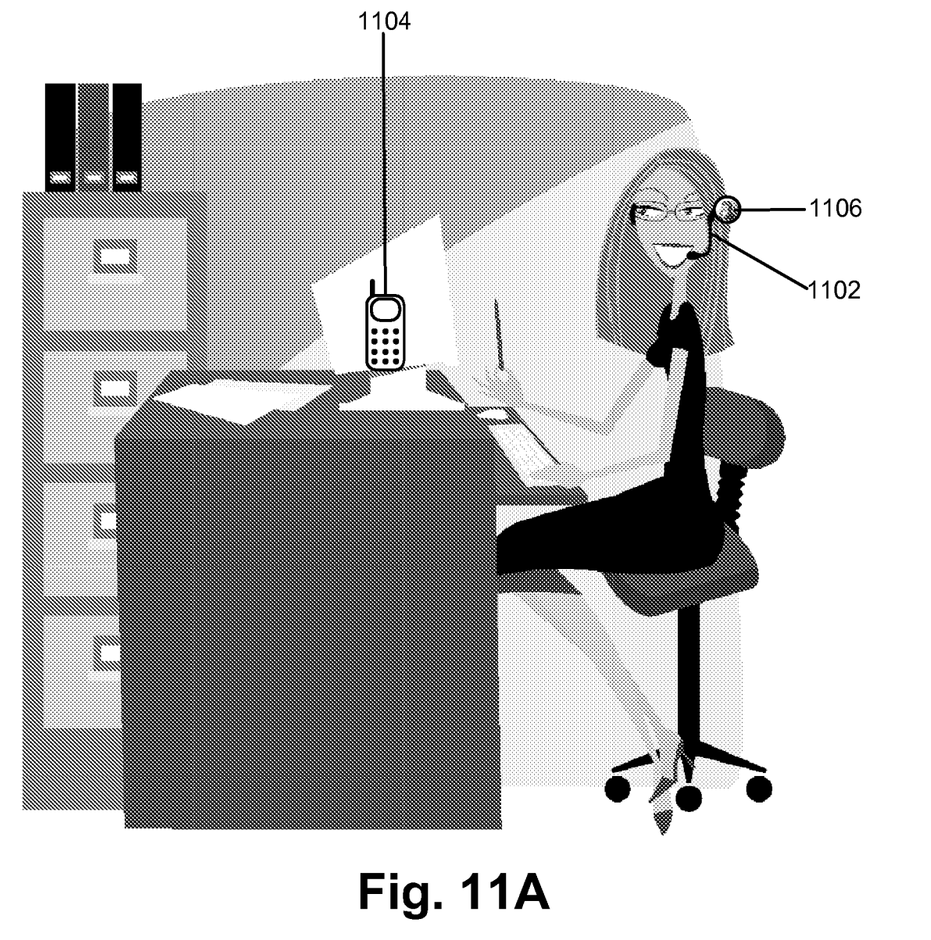
FIG. 11A shows a cellular phone and a person using a headset with displays.
Figure 11B:
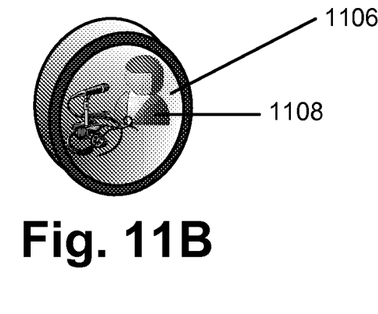
FIG. 11B shows an image that may be displayed when Erika is speaking.
Figure 11C:
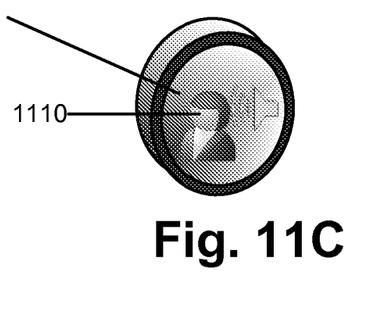
FIG. 11C shows an image that may be displayed when Erika is listening.

The following example illustrates processes involved in sending an image to and displaying the image at a personal peripheral, with reference to FIGS. 11A-11C. The example is consistent with the exemplary processes described above with references to FIGS. 8 and 9.

Assume that Erika has a personal peripheral in the form of a headset 1102 and that Erika uses headset 1102 in conjunction with a main device, in the form of a cellular phone 1104, as illustrated in FIG. 11A.

When cellular phone 1104 receives a call from Erika's friend, cellular phone 1104 may identify a phone call handling application in cellular phone 1104 as the application that is active, and may retrieve images that are associated with the phone call handling application.

During the call, when Erika speaks, headset 1102 or cellular phone 1104 may detect an audio signal from the microphone on headset 1102, and one of the images 1108 may be displayed on display 1106. FIG. 11B shows image 1108 that may be displayed on display 1106 when Erika speaks. If headset 1102 or cellular phone 1104 detects a transmission of an audio signal from cellular phone 1104 to headset 1102, headset 1102 or cellular phone 1104 may cause the other image 1110 to be displayed on display 1106. FIG. 11C shows image 1110 that may be displayed on display 1106 when Erika listens to the audio signal.

By displaying images 1108 and 1110 while Erika interacts with her friend, headset 1102 may let others in her office know whether Erika is actively engaged in a phone conversation or not, and may provide them with opportunities to speak to Erika without interfering with her call.

CONCLUSION

The foregoing description of embodiments provides illustration, but is not intended to be exhaustive or to limit the embodiments to the precise form disclosed. Modifications and variations are possible in light of the above teachings or may be acquired from practice of the teachings.

For example, while series of blocks have been described with regard to processes illustrated in FIGS. 8 and 9, the order of the blocks may be modified in other implementations. For example, block 904 may be performed before 906 in some implementations. In addition, non-dependent blocks may represent acts that can be performed in parallel with a number of other blocks.

It will be apparent that aspects described herein may be implemented in many different forms of software, firmware, and hardware in the implementations illustrated in the figures. The actual software code or specialized control hardware used to implement aspects should not be construed as limiting. Thus, the operation and behavior of the aspects were described without reference to the specific software code—it being understood that software and control hardware can be designed to implement the aspects based on the description herein.

No element, act, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, a microprocessor, an application specific integrated circuit, or a field programmable gate array, software, or a combination of hardware and software.

What is claimed is:

1. A headset comprising:
   a communication interface to interface with a communication device;
   a microphone to receive audible information from a user of the communication device; and
   a pair of earpieces, each earpiece including:
      a speaker to present, to the user, an audio signal transmitted from the communication device, and
      a display to:
         selectively display, based on the audible information, a first image, of a plurality of images, when a communication application is executing on the communication device, and
         selectively display, based on the audio signal, a second image, of the plurality of images, when the communication application is executing on the communication device, where the first image and the second image differ.

2. The headset of claim 1, where the communication interface includes:
   a wireless communication interface.

3. The headset of claim 1, further comprising:
   a processor to cause an alternate display of the first image, via a first one of the pair of displays, and the second image, via a second one of the pair of displays, based on display information that is received from the communication device at the communication interface.

4. The headset of claim 1, where the second image includes a video associated with the audio signal.

5. The headset of claim 1, further comprising:
   a memory to store images, of the plurality of images, that are received from the communication device.

6. The headset of claim 1, the plurality of images including an image of a particular person associated with a telephone number of an incoming call received at the communication device, where the display is to display the image of the particular person before the user accepts the incoming call.

7. The headset of claim 1, where the display is further to:
selectively display, when the communication application is not executing on the communication device, a third image, of the plurality of images, when the communication application is not currently being executed at the communication device.

8. A communication device comprising:
a communication interface to establish a communication link with a headset that includes:
  a microphone to receive audible information, from a user of the headset, to be sent to the communication device via the communication link, and
  a pair of earpieces, each earpiece including a speaker to present an audio signal transmitted from the communication device via the communication interface, and a display to display a plurality of images; and
a processor to:
  retrieve a first particular image, of the plurality of images, and a second particular image, of the plurality of images;
  generate display information, identifying one particular display, of the displays, to display the first particular image, and identifying another particular display, of the displays, to display the second particular image, based on the audible information and the audio signal, respectively, where the first and second particular images differ; and
  send the display information, the retrieved first particular image, and the retrieved second particular image to the headset through the communication link.

9. The communication device of claim 8, further comprising:
a database that includes pieces of information, each piece of information relating each of the plurality of images to the one particular display or the other particular display.

10. The communication device of claim 8, where the communication device includes at least one of:
a mobile device, an audio player, or a video game console.

11. An earpiece comprising:
a communication interface to receive, from a first communication device:
  a first image and first display information, where the first display information includes instructions to display the first image based on detection of a first audio signal being transmitted from the first communication device to a second communication device, and
  a second image and second display information, where the second display information includes instructions to display the second image based on detection of a second audio signal being received at the first communication device from the second communication device; and
a display to alternately display the first image and the second image, based on the first and second display information, when the first communication device and the second communication device are in communication.

12. The earpiece of claim 11, where the communication interface includes:
a wireless communication interface.

13. The earpiece of claim 11, where the communication interface is further to receive and the display is further to display:
an image of a particular person associated with a telephone number of an incoming call received at the first communication device.

14. The earpiece of claim 11, where the communication interface is further to receive and the display is further to display:
an image associated with an idle state when the first communication device is not in communication with the second communication device or any other communication device.

15. The earpiece of claim 11, further comprising:
a speaker to render the second audio signal to a person using the earpiece.

16. A communication system including:
a headset comprising:
  a communication interface to interface with a communication device,
  a microphone to receive audible information from a user of the communication device, and
  a pair of earpieces, each earpiece including:
    a speaker to present, to the user, an audio signal transmitted from the communication device, and
    a display to display a plurality of images; and
the communication device comprising:
  a communication link with the communication interface of the headset, and
  a processor to:
    retrieve a first particular image, of the plurality of images, and a second particular image, of the plurality of images;
    generate display information, identifying one particular display, of the displays, to display the first particular image, and identifying another particular display, of the displays, to display the second particular image, based on detection of the audible information and transmission of the audio signal, respectively, where the first and second particular images differ; and
    send the display information, the retrieved first particular image, and the retrieved second particular image to the headset through the communication link.

17. A headset comprising:
means for receiving, via a wireless communication link of a first communication device:
  a first image and first display information, where the first display information includes instructions to display the first image based on detection of a first audio signal being transmitted from the first communication device to a second communication device, and
  a second image and second display information, where the second display information includes instructions to display the second image based on detection of a second audio signal being received at the first communication device from the second communication device; and
means for alternately displaying the first image and the second image, on a display that is integrated into an earpiece of the headset, based on the first and second display information, when the first communication device and the second communication device are in communication.

* * * * *